United States Patent
Lantheaume et al.

(10) Patent No.: US 9,053,403 B2
(45) Date of Patent: Jun. 9, 2015

(54) DEVICE HAVING REDUCED OVERALL DIMENSIONS FOR IDENTIFYING A METAL SUBSTRATE IN A DUSTY AND METALLIC ENVIRONMENT, AND APPLICATION FOR IDENTIFYING CONTAINERS CONTAINING NUCLEAR FUEL ELEMENTS IN THE PRODUCTION PLANT THEREOF

(75) Inventors: Noël Lantheaume, Vallerargues (FR); Jean-Jacques Marchal, Lieuran-Cabrieres (FR)

(73) Assignee: AREVA NC, Paris (FR)

( * ) Notice: Subject to any disclaimer, the term of this patent is extended or adjusted under 35 U.S.C. 154(b) by 336 days.

(21) Appl. No.: 13/514,256

(22) PCT Filed: Dec. 2, 2010

(86) PCT No.: PCT/EP2010/068692
§ 371 (c)(1),
(2), (4) Date: Aug. 15, 2012

(87) PCT Pub. No.: WO2011/069878
PCT Pub. Date: Jun. 16, 2011

(65) Prior Publication Data
US 2012/0305647 A1    Dec. 6, 2012

(30) Foreign Application Priority Data
Dec. 7, 2009 (FR) ..................................... 09 58702

(51) Int. Cl.
*G06K 7/10* (2006.01)
*G06K 19/077* (2006.01)
(Continued)

(52) U.S. Cl.
CPC ...... *G06K 19/07749* (2013.01); *G06K 7/10178* (2013.01); *G06K 7/10316* (2013.01); *G06K 7/10336* (2013.01); *G06K 19/07771* (2013.01);
(Continued)

(58) Field of Classification Search
USPC ........................... 235/375, 487, 492, 439, 383
See application file for complete search history.

(56) References Cited

U.S. PATENT DOCUMENTS 5,103,235 A * 4/1992 Clemens ....................... 343/742
2006/0238430 A1    10/2006 Morioka et al.

FOREIGN PATENT DOCUMENTS

| GB | 2 422 959 A | 8/2006 |
|---|---|---|
| JP | 56-027509 | 3/1981 |
| JP | 2004-127057 A | 4/2004 |
| JP | 2006-184082 A | 7/2006 |
| JP | 2007-257614 A | 10/2007 |
| JP | 2008-097332 A | 4/2008 |

(Continued)

OTHER PUBLICATIONS

Notification of Reasons for Refusal dated Apr. 15, 2014, in Japanese Patent Application No. 2012-542456, with English-language translation.

*Primary Examiner* — Karl D Frech
(74) *Attorney, Agent, or Firm* — Miles & Stockbridge P.C.

(57) ABSTRACT

A device for identifying a metal substrate present in a strongly metallic environment that may also be dusty. The device includes a passive radio-frequency identification (RFID) label, a label carrier suitable for being attached to the metal substrate and to position the label at a distance therefrom, and a RFID reader having an antenna that includes, as an induction loop, two sections of a coaxial cable having a substantially identical length and each including a metal core and a metal pleat surrounding the core, the two sections being linked together, on the one hand, at one end thereof by connecting the core of one to the pleat of the other and conversely and, on the other hand, at the other end thereof by connecting only the pleats together, the cores thereof being separated at said other end.

34 Claims, 7 Drawing Sheets

(51) Int. Cl.
 G21F 5/008 (2006.01)
 G21F 7/04 (2006.01)
 H01Q 1/22 (2006.01)
 H01Q 7/00 (2006.01)
 H01Q 7/04 (2006.01)

(52) U.S. Cl.
 CPC ...... *G21F 5/008* (2013.01); *G21F 7/04* (2013.01); *H01Q 1/2225* (2013.01); *H01Q 7/00* (2013.01); *H01Q 7/04* (2013.01)

(56) References Cited

FOREIGN PATENT DOCUMENTS

| | | |
|---|---|---|
| JP | 2009-115544 A | 5/2009 |
| WO | WO 03/096478 A1 | 11/2003 |
| WO | WO 2004/084348 A1 | 9/2004 |
| WO | WO 2004/100309 A2 | 11/2004 |
| WO | WO 2006/039461 A2 | 4/2006 |
| WO | WO 2007/066204 A2 | 6/2007 |

* cited by examiner

DEVICE HAVING REDUCED OVERALL DIMENSIONS FOR IDENTIFYING A METAL SUBSTRATE IN A DUSTY AND METALLIC ENVIRONMENT, AND APPLICATION FOR IDENTIFYING CONTAINERS CONTAINING NUCLEAR FUEL ELEMENTS IN THE PRODUCTION PLANT THEREOF

TECHNICAL FIELD

The invention relates to a device for identifying a metal substrate present in a dusty and metallic environment, of reduced size.

More particularly, it relates to the adaptation of a radiofrequency identification system (RFID) subjected to size constraints and metal and dust constraints of a support and an environment in which the support is present.

The main application targeted by the invention is the identification of containers, such as casks, containing nuclear fuel elements in the production plant thereof.

It is pointed out here that within the scope of the invention, the casks transport jars of powder, such as powders of plutonium oxide and/or uranium oxide and/or chamotte, and have the function of serving both as biological protection vis-à-vis persons and the vehicle for transporting the jars between for example a storage area and different production work stations of a unit.

PRIOR ART

In a production plant, the identification of containers during each transfer from a production or storage unit to another unit must be guaranteed in order to ensure at one and the same time:

- the management and the monitoring of nuclear materials in accordance with the instructions of national and international safety authorities,
- the traceability of the fuel product throughout the production process.

As device for identifying containers in the nuclear industry, marking by bar code associated with an optical reader is generally used. This type of device does not give entire satisfaction, in the environment defined by a glove box in "powder" work stations of a unit, because the environment is confined and dusty. The fine particles deposit on the label and the reader. The contrast of the bar code is decreased, thereby reducing its legibility. The optical reader also becomes covered with dust and ages rapidly.

For reasons of distance and fouling of the translucent panels of glove boxes, the present technology does not make it possible to envisage a reliable result by installing the readers outside of the glove box to protect them from dust and radiation.

The inventors then sought firstly to determine all of the constraints linked to this glove box environment then secondly they carried out a review of the various alternative technologies used in the industry.

They then arrived at the conclusion that a radiofrequency identification device (RFID) was intrinsically the best able to fit the environment because it makes it possible to have:

- a 100% reading success rate objective,
- a reader installed outside of the glove box,
- a rapid reading,
- a reading insensitive to dust.

On the other hand, they arrived at the conclusion that the RFID identification devices on the market were not suitable for the small dimensions and highly metallic environment created by the glove box itself with or without the shut-off devices thereof for the passage of gloves and the container to be identified.

An aim of the invention is then to propose a device for identifying by radiofrequency (RFID) a container containing nuclear fuel elements which has reduced size and which is reliable in the strongly metallic environment created by the glove box itself with or without its shut-off devices for the passage of gloves and the container to be identified.

A more general aim of the invention is to propose a radiofrequency identification device (RFID) of a metal substrate present in a dusty and highly metallic environment which is reliable and of reduced size.

DESCRIPTION OF THE INVENTION

To do this, according to a first embodiment of the invention, a device is provided for identifying a metal substrate present in a strongly metallic environment that may also be dusty, comprising a passive radio-frequency identification (RFID) label, a label carrier comprising a ferrite element suitable for being attached to the metal substrate and to position the label at a distance therefrom comprising a short-circuit looping laid out inside the circuit looping of the label antenna, and an RFID reader having an antenna that includes, as induction loop, two sections of coaxial cable having a substantially identical length and each including a metal core and a metal pleat surrounding the core, the two sections being linked together on the one hand at one end thereof by connecting the core of one to the pleat of the other and conversely and, on the other hand, at the other end thereof by connecting only the pleats together, the cores thereof being separated at said other end.

According to a second embodiment of the invention, a device is provided for identifying a metal substrate present in a strongly metallic environment that may also be dusty, comprising a radiofrequency identification (RFID) label, a label carrier made of electrically insulating material suitable for being attached to the metal substrate and to position the label at a distance therefrom and comprising a housing suitable for completely housing the label, and an RFID reader, the antenna of which is constituted of two sections of coaxial cable having a substantially identical length and each including a metal core and a metal pleat surrounding the core, the two sections being linked together on the one hand at one end thereof by connecting the core of one to the pleat of the other and conversely and, on the other hand, at the other end thereof by connecting only the pleats together, the cores thereof being separated at said other end.

Within the scope of the invention, the environment is called "highly metallic" because within it are found different materials for the most part made of metal of different nature (stainless steel, aluminium, steel). For example, when the environment is defined by the inside of a glove box in the nuclear sector, numerous mechanical sub-assemblies are present: motors, conveyors constituted of stainless steel rollers on which a cask is able to be transported, a lift for raising the cask in the upper part of the glove box, etc. Moreover, on the walls are placed metal bandings to put in place gloves and bowls suitable for producing a biological protection.

Thus, thanks to the distancing of the label with respect to the metal substrate by electrically isolating it, a notable reduction in its effective surface is avoided while at the same time maintaining a restricted size. The label being moreover housed in a completely sealed manner in a housing, its functions are not altered in a dusty environment.

The choice of producing the antenna of the RFID reader is particularly judicious: it makes it possible to obtain an intrinsic resonance frequency, in other words outside of the installed configuration in the environment, substantially equal to that of the label while maintaining a restricted size. Typically, for a high frequency label at 13.56 MHz, it is possible to use a coaxial cable of average capacitance of the order of 97 pF and form a total length of the two sections of the antenna reader of the order of 1.2 mm. As explained hereafter, the fact of creating a discontinuity in the coaxial cable as formed makes it possible to obtain an increased emission surface while maintaining a restricted size.

The label carrier is a part made of electrically insulating material comprising a slide housing in which the RFID label can slide. Advantageously, the part made of electrically insulating material is based on polyethylene (HDPE). This simple choice makes it possible not to modify the inductance and thereby the auto-resonance frequency of the label.

Preferably, the dimensions of the label carrier are suitable to position the label at a distance of at least 4 mm, preferably 12 mm, from the metal substrate. As explained hereafter, the inventors have established that at this distance, the label has a sufficient dimension of its effective surface to be activated and read, even in movement, by the antenna of the RFID reader, typically installed at a nominal distance of the order of 275 mm. The inventors have moreover noted that an operating limit value of the identification device during a lateral movement was of the order of 70 mm around said nominal distance i.e. a limit distance of the order of 345 mm.

The diameter of the sections of coaxial cable is advantageously less than or equal to 1.05 mm. By thus using a coaxial cable with these small dimensions, the visibility of the translucent walls of an enclosure to which the antenna RFID reader is attached is altered as little as possible.

Advantageously, an electronic correction cell is provided connected to the cores separated from the antenna loop, the cell comprising means for adapting the impedance and tuning the frequency of the antenna loop in installed configuration in the environment. Thus, the adaptation of the impedance, typically at 50Ω, and the tuning of the frequency of the antenna reader, typically in the regions of 13.56 MHz can be carried out on a case by case basis as a function of the more or less metallic environment in which the identification device is present.

For producing the supply of the antenna loop of the reader, preferably a primary loop is provided which enables an electromagnetic coupling, the primary loop being connected to an electronic module of the reader suitable for reading identification data from the passive label. This solution is favoured because it makes it possible to bring the power into the requisite radiofrequency without damaging the robustness of the RLC resonator constituted in part of the sections of correction coaxial cable and at the same time enabling their adaptation to the requisite impedance, typically 50Ω. As explained hereafter, this solution by electromagnetic coupling with primary loop makes it possible moreover not to increase the dimensions of the supply circuit, since it is possible to install the primary loop inside and as near as possible to the antenna loop constituted of two sections of coaxial cable.

According to an advantageous embodiment, the label is adapted to emit at a frequency of 13.56 MHz, the two sections of coaxial cable of the antenna of the reader have an average capacitance of 97 pF/m and a total length of the order of 1.2 m. With these characteristics, an intrinsic resonance frequency value of the antenna reader is obtained, in other words outside of its installation in a strongly metallic environment, substantially equal to 13.56 MHz, i.e. the resonance frequency value of the label, and does so despite the relative small total length of the antenna, of the order of 1.2 m, compatible with an environment of low dimensions.

The invention also relates to a metallic container on which is attached a label carrier of the identification device as described previously.

Such a container constitutes advantageously a cask suitable for containing nuclear fuel elements, such as the powder of plutonium oxides and/or uranium oxides and/or chamotte.

The invention finally relates to an enclosure comprising walls demarcating a confined strongly metallic environment that may also be dusty, with at least one wall on which is attached the antenna of the RFID reader of the identification device described previously.

Advantageously when the walls of the enclosure are translucent, the sections of antenna are attached to the periphery of a transparent plate-support itself attached to one of the translucent walls of the enclosure. It is thus possible to produce an antenna loop the most extended possible without altering the vision that it is possible or necessary to have through the enclosure walls.

Preferably, in order not to undergo too many deformations, the sections of antenna are attached to the periphery of the plate-support such that their radius of curvature is less than 4 mm all along the periphery.

When the enclosure has biological protection properties vis-à-vis an individual positioned outside, such as when one of the translucent walls comprises a lead glass based panel and another panel based on glass other than lead, the plate-support of the sections of antenna is preferably inserted between the two panels of the translucent wall. The antenna loop constituted of the two sections of coaxial cable is thereby not influenced by the thickness and the biological protection material (lead).

When the enclosure is of the glove box type, in other words when one of the walls is pierced with holes each surrounded by a metal banding suitable for receiving a glove for handling a container inside the enclosure, the shape of the plate-support of the sections of antenna advantageously hugs that of at least one metal banding without surrounding it. Thanks to such a lay out, it is ensured that the metal banding(s) concerned is (are) traversed by a current induced by the current flowing through the sections of antenna, which adds itself to the latter. In other words, the metallic banding(s) contribute to increasing the electromagnetic field produced by the sections of antenna and necessary for the supply of the label.

Again preferably, the shape of the plate-support of the sections of antenna hugs those of at least two metal bandings without surrounding any thereof. This is perfectly suited when the glove box is of the four glove ports type, laid out by pairs at a different height, the pairs being offset in relation to each other.

The invention finally relates to the application of the device described previously to the identification of casks containing nuclear fuel elements in the production unit thereof. Said casks are for example jars of powder and the identification thereof takes place at each production work station between that of production of powder and the storage tunnel of the production unit thereof.

BRIEF DESCRIPTION OF DRAWINGS

Other advantages and characteristics of the invention will become clearer on reading the detailed description given with reference to FIGS. 1 to 9 which represent respectively.

DETAILED DESCRIPTION OF PARTICULAR EMBODIMENTS

The identification device according to the invention uses as components a passive label and an RFID reader complying with the ISO 15693 standard.

Typically, the label is a passive label of frequency equal to 13.56 MHz. For example, the label is that commercialised by the RAFSEC company of dimensions 45*76 mm and incorporating a chip with the trade name "Philips Icode2 SLI".

The RFID reader uses for its part a module with a power of 1.7 W on an impedance of 50 Ohm. For example the reader used is that bearing part number "RR-IDISC-MR200-A".

The invention relates both to the definition of a label carrier suitable for being attached to a metal substrate and an antenna loop of RFID reader that make it possible to become free of any perturbations linked to a strongly metallic environment, which moreover may also be dusty.

Although described with reference to an application to the identification of metal jars containing nuclear fuel powder in a glove box type environment as a liaison module in a precise work station of production of nuclear fuel elements, the invention can just as easily apply to other also high metallic and dusty environments.

In this precise application, in which the glove box comprises translucent walls, such as Lexan®, Plexiglas® or based on lead glass, the inventors firstly noted that these walls had a negligible influence on the tuning frequency and on the level of emission of a passive label at 13.56 MHz.

The inventors then studied the influence of the metallic nature of the support to be identified on the passive label at 13.56 MHz.

Figure 1:
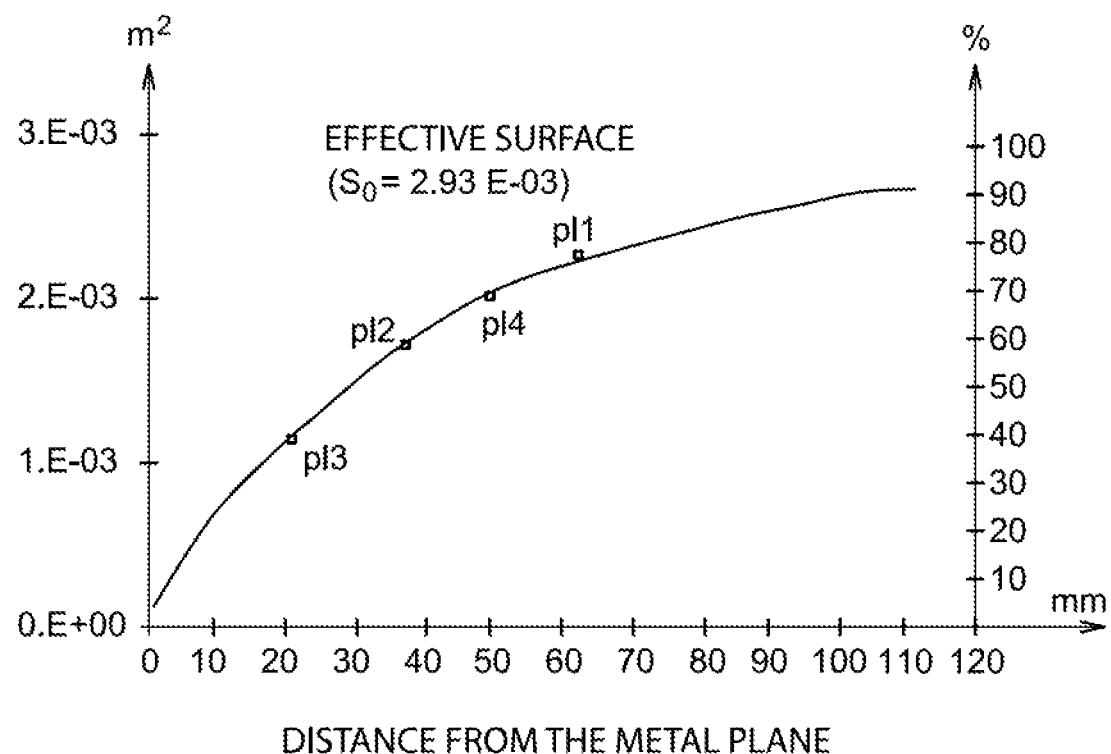
FIG. 1 shows an experimental curve illustrating the metallic influence of a support to be identified on the effective surface of a RFID label.

FIG. 1 is a curve showing the variation in the effective surface of a passive label antenna at 13.56 MHz with respect to its distance to a metallic plane characterising the exterior wall of a metallic cask, typically made of stainless steel.

It may be seen that the influence is considerable below 30 mm, distance at which the reduction in the effective surface of the antenna of the label is already of the order of 50%. It is only equal to 10% of the real value of the antenna below 3.5 mm and is quasi-zero when the label is in direct contact with the metal substrate.

Also, the inventors have analysed that it was necessary to increase the effective surface of the label antenna. Given the very restricted dimensions of the glove box environment, they also analysed that the solution retained should comply with very strict size constraints. They then considered two solutions:

1/ either to insert a plate of ferrite between the label antenna and the metal substrate to be identified, 2/ or to place at a distance the label while electrically insulating the metal substrate to be identified.

For the solution 1/ increase in effective surface, the inventors firstly searched for existing plates of ferrite. They opted for plates of ferrite of the manufacturer Kaschke made of grade "K40", the permeability of which is 40 at 20° C., which is useable for a frequency of use up to more than 50 MHz.

They then tested plates of perfectly defined dimensions. They used the same test protocol as that described in reference to FIG. 1 but interposing between the antenna of the reference label (13.56 MHz) and the metallic plane, a plate of ferrite.

The different elements of ferrite with plates of the following dimensions (respectively corresponding to the length, width and thickness) have been tested:

ferrite element N°1: two plates side by side of total dimensions: 200 mm*120 mm*3.75 mm, ferrite element N°2: a plate of dimensions: 200 mm*120 mm*3.75 mm, ferrite element N°3: a plate of dimensions: 100 mm*56 mm*3.75 mm, ferrite element N°4: two plates one above the other of total dimensions: 100 mm*120 mm*7.5 mm.

The effective surfaces have been reported in FIG. 1 respectively at the points pl1, pl2, pl3 and pl4. It is thereby possible to establish a correspondence between the ferrite element used and the equivalent air distance, in other words insulator.

It may thus be noted that for a same thickness (3.75 mm), the equivalent air distance is all the greater the bigger the plate surface. In fact, for:

the ferrite element N°1, the effective surface is 74%, i.e. an equivalent air distance of 61 mm, the ferrite element N°2, the effective surface is 56%, i.e. an equivalent air distance of 36 mm, the ferrite element N°3, the effective surface is 40%, i.e. an equivalent air distance of 21 mm.

It is also observed that for a same plate format (100 mm*120 mm), the effective surface increases with the thickness of the ferrite element but the gain in equivalent air distance diminishes with the thickness of ferrite. In fact, for:
   the ferrite element N°2, the effective surface is 56% i.e. an equivalent air distance of 36 mm,
   the ferrite element N°4, the effective surface is 67% i.e. an equivalent air distance of 48 mm.

Given the available size on the bracket of the cask, the inventors have chosen a ferrite element constituted of a single plate of dimensions 60 mm*100 mm*3.75 mm, which leads to a reduction in the apparent surface of the antenna of the passive label of the order of 50%.

The inventors then carried out an experiment to measure the resonance frequency of a label as a function of the mounting of the label with its ferrite element with respect to the metallic plane.

A label commercialised by the RAFSEC Company of dimensions 45*76 mm and incorporating a chip of trade name "Philips I-Code SLI" and the sales code 3000165, has been chosen as reference label. It is placed above the ferrite element N°3, the latter being laid above the metallic plane of flat dimensions of 32 cm*30 cm.

A magnetic field emission loop is then placed at a distance of around 25 cms above the label.

Figure 2:
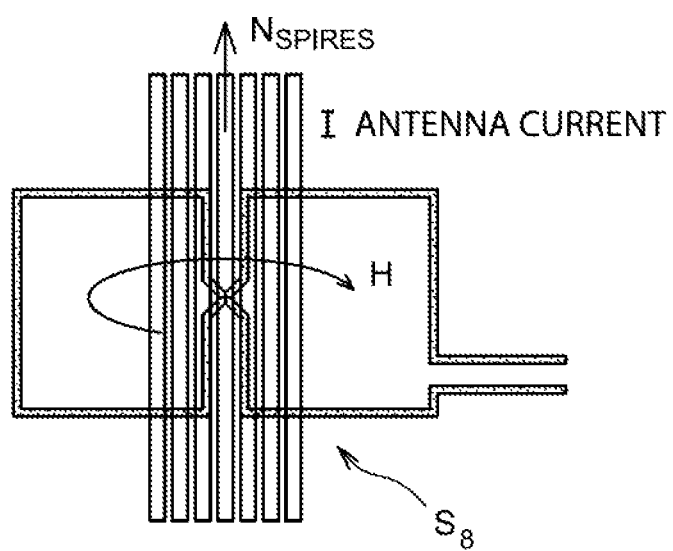
FIG. 2 shows schematically a magnetic field measurement probe used to measure the field produced in the antenna of a RFID label in test conditions.

A figure of eight magnetic field probe S8, as represented schematically in FIG. 2, is then positioned on the spires of the antenna of the label so as to take only the magnetic field produced by the circulation of the current in the antenna of the label.

In parallel, a magnetic field probe is also placed at the centre of an emission loop in order to control the magnetic field emitted.

The resonance frequency is then measured from the response obtained by the figure of eight emission probe from the S8 probe for a constant primary field, the frequency of which is made to vary.

The measured intrinsic frequency of the reference label has a value of 14.27 MHz.

It may be observed that when the reference label is pressed against the ferrite element N°3, the resonance frequency drops to a value of 10.0 MHz.

There is thus a very substantial influence of the distance between the spires of the RFID antenna and the ferrite element.

Figure 3:
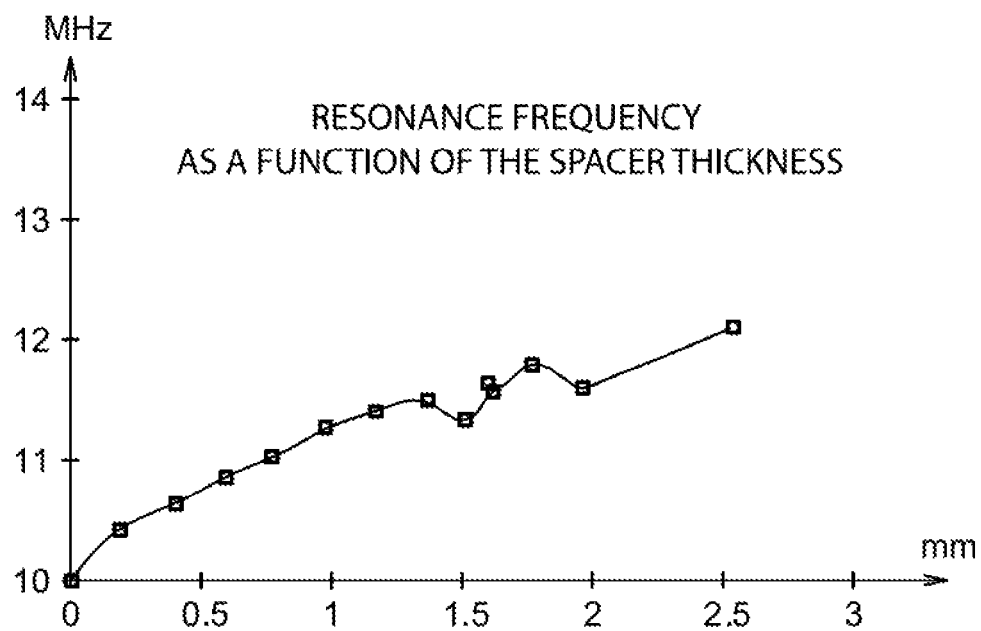
FIG. 3 shows an experimental curve illustrating the influence on the resonance frequency of a RFID label according to a first embodiment of the invention, of a spacer placed between a metal substrate to be identified and the RFID label.

Resonance frequency readings were then taken with a spacer of different thicknesses placed between the RFID label and the ferrite element N°3. The curve represented in FIG. 3 illustrates the evolution of this resonance frequency as a function of the thickness of the spacer. This curve exhibits points offset with respect to the evolution trend: they correspond in fact to the difference in materials used for the spacer, namely respectively Teflon, polypropylene, glass-epoxy FR4. Thus, for the point corresponding to a thickness equal to 1.6 mm, a spacer in the shape of a plate in glass-epoxy FR4 has been used. This shows that the antenna of the RFID label is thus also sensitive to the electrical permeability of the material in the immediate proximity of the spires thereof. It may be concluded therefrom that a material of high permeability is capable of causing a more important reduction in the resonance frequency. It may also be concluded therefrom that with a spacer of 2 mm, the resonance frequency can be increased by around 2 Mhz.

The inventors then concluded that in the context of the invention, where the size needs to remain restricted, it was not possible to define a spacer sufficiently thin to manage to bring back the resonance frequency to its original value.

The inventors then considered that two means could be envisaged to bring back the resonance frequency to an optimal value:
   either to modify the antenna of the label, but that imposes having to resort to a specific production of RFID antenna or to carry out a transfer of integrated circuits, such as the I-code chip, onto a standard antenna circuit,
   or to add a secondary corrector circuit to a standard RFID antenna, in other words an antenna available immediately on the market.

With regard to the difficulty of production and the related costs, the inventors then decided to form a secondary corrector circuit of RFID antenna.

After experimentation, the inventors concluded that a corrector circuit present uniquely on the external part of the RFID antenna, in other words the zone between the middle spire of the antenna of the label and the edge of the plate of ferrite does not make it possible to obtain a sufficient correction of the resonance frequency of the RFID antenna.

Even if a short-circuit looping laid out inside the antenna circuit of the label reduces the effective surface thereof, this lay out advantageously makes it possible to obtain a satisfactory correction of resonance frequency.

Figure 4:
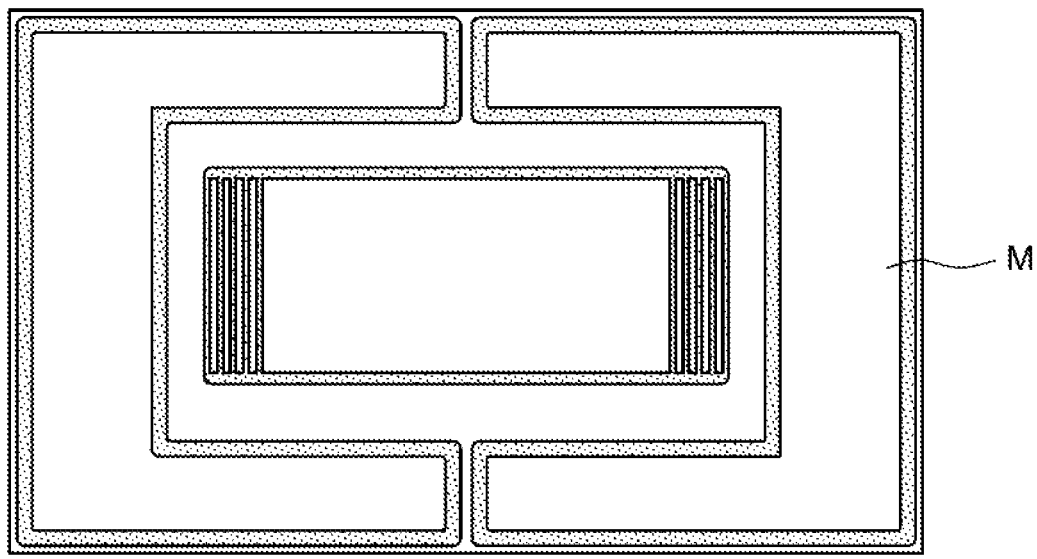
FIG. 4 shows schematically an etching mask used for producing a correcting circuit of the resonance frequency of the RFFID label according to the first embodiment of the invention.

FIG. 4 represents schematically a mask M of a copper circuit of the corrector used for the reference RFID label. It may be seen in this FIG. 4 that the internal circuit has multiple branches provided with restriction, the cut off of which enables a geometry adjustment.

Figure 5:
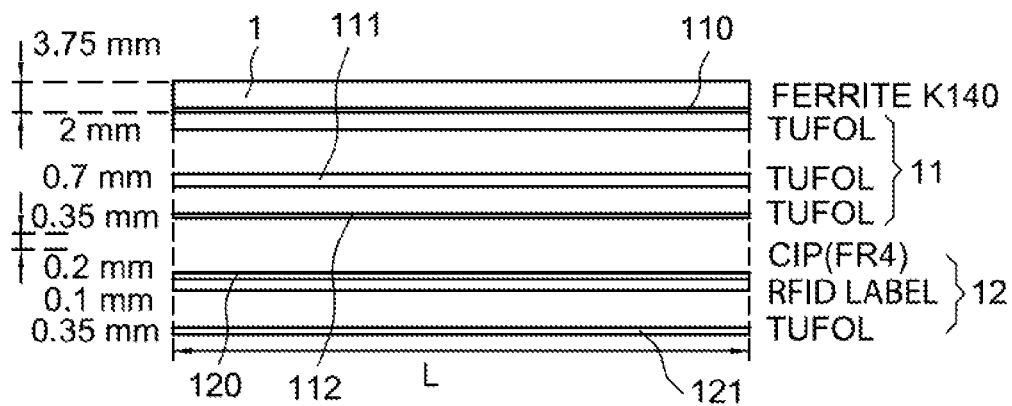
FIG. 5 is an exploded view of a label carrier with the RFID label according to the first embodiment, the label carrier being suitable for being attached to a metal substrate to be identified.

In FIG. 5 is represented an exploded side view of a label carrier 1 assembly comprising a reference RFID label and a ferrite element N°3 bonded onto a collector circuit constituted of a short-circuit looping laid out inside the looping of the circuit of the reference antenna.

More exactly, the assembly is produced by bonding of different layers of materials, namely:
   an element 1 of ferrite N°3 (of K40 type commercialised by the Kaschke Company, of dimensions equal to 60*100*3.75 mm),
   a spacer 11 made of electrically insulating and non magnetic material constituted of three 110, 111, 112 layers of tufol of a total thickness of the order of 3 mm,
   an assembly 12 constituted of the RFID label bonded to a copper printed circuit, of a thickness of 35 µm, formed on a substrate 120 in FR4 of a thickness of 0.2 mm, the label being protected by a layer of tufol 121 of a thickness of 0.35 mm.

For the solution 2/ increase in effective surface, the inventors finally retained a label carrier made of polyethylene HDPE enabling a sufficiently far distancing of the metallic mass of the metallic support (container) to be identified. For the glove box application, they retained an advantageous distancing of the order of 12 mm between the label and the top of the metallic part of the handle of the cask. Moreover, such a positioning of the label above the handle of the cask leads to moving the label away from the body of the cask by around 40 mm.

Figure 6:
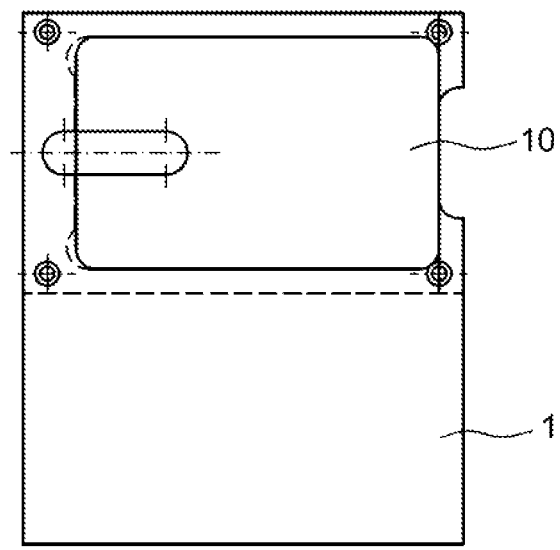
FIGS. 6 and 6A are respectively a front and side view of a label carrier according to a second embodiment of the invention, the label carrier being suitable for being attached to a metal substrate to be identified.
Figure 6A:
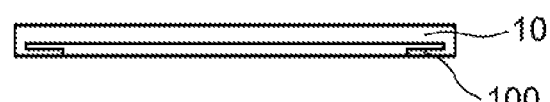

As represented in FIGS. 6 and 6A, the HDPE label carrier 1 according to the invention comprises a housing 10 of the label strictly speaking which itself comprises a slide 100, which makes it possible to completely house the passive RFID label in use and thus protect it from all dust likely to be present in the environment, such as nuclear fuel powder in suspension. The slide 100 moreover enables an easy insertion and extraction of the label if necessary.

As regards the method of attachment of the label carrier, it is provided advantageously to pierce it with holes, typically two in number, for a screw attachment preferably to the handle of the cask.

As regards the antenna of the RFID reader, the inventors have chosen as hypothesis to consider the antenna as being a resonating antenna of inductive type with a targeted resonance frequency equal to the frequency of the label i.e. 13.56 MHz and thus with a targeted impedance of 50 Ohms. Yet, by virtue of their knowledge of this type of antenna, the inventors have sought to minimise the electrical aspect thereof. Electrical aspect is taken to mean that the different parts of the antenna circuit can have differences in electrical potentials and thus confer variable electrical characteristics to the antenna. In other words, the antenna reader does not achieve only an electromagnetic coupling with the passive label.

Yet, the greater the electrical aspect of the reader, the greater the strongly metallic environment is capable of influencing the inductive characteristics of the antenna by rendering it unstable, for example by hand effect.

The inventors then sought a production of antenna that thus minimises as much as possible the electrical aspect. Yet, the known solutions available to them, such as an electrical shielding of the antenna circuit or a dividing up thereof with an electrical symmetry, was not suitable in the present situation because they lead to a greater size of the circuit of the antenna reader.

Figure 7:
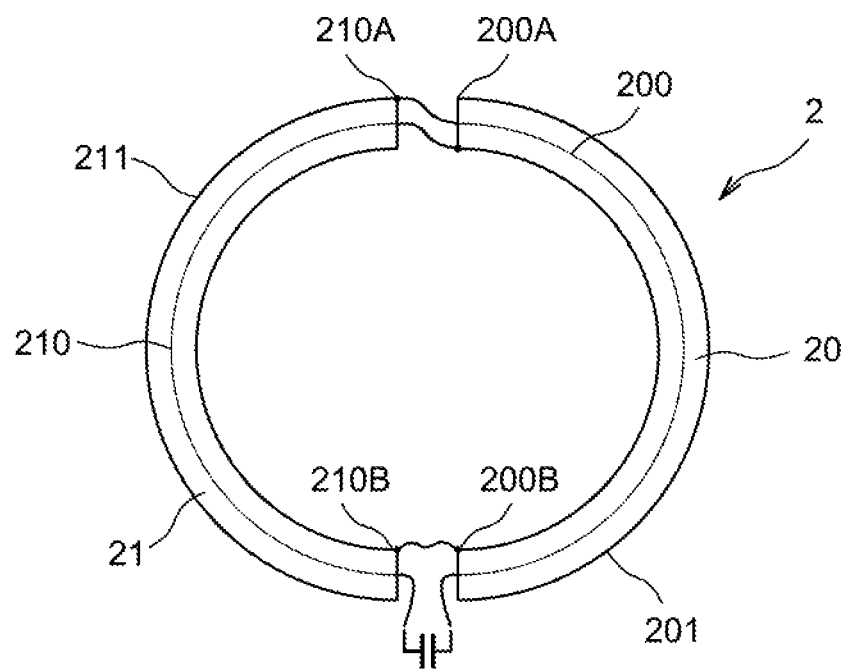
FIG. 7 is a schematic front view of an antenna loop of an RFID reader according to the invention.

Also, the inventors have thus defined a structure of antenna as shown in FIG. 7: the antenna 2 includes, as an induction loop, two sections 20, 21 of coaxial cable having a substantially identical length. Each section of coaxial cable 20, 21 each comprises a metal core 200, 210 and a metal pleat surrounding the core 201, 211. The two sections 20, 21 are linked together on the one hand at one end thereof 200A, 210A, by connecting the core 200 of one to the pleat 211 of the other and conversely (core 210 connected to pleat 201) and, on the other hand, at the other end thereof 200B, 210B, by connecting only their pleats 201, 211 together, their cores 200, 210 being separated at said other end. The antenna thus has, as it were, two loops without division.

Each section of cable used is from a sub-miniature coaxial cable commercialised by the AXON Company under the commercial reference SM 50 with a diameter substantially equal to 1.05 mm of lineic capacitance of the order of 97 pF/m.

Typically, the total length of the coaxial ring thereby produced, with discontinuities between core and pleats, is of the order of 1.2 m, i.e. a total capacitance of 120 pF and thus leads to an intrinsic resonance frequency of the order of 14 MHz.

Moreover, as explained hereafter, the very low diameter of the sections makes it possible not to alter the vision through the translucent walls of the enclosure to which the antenna reader may be attached.

Figure 8:
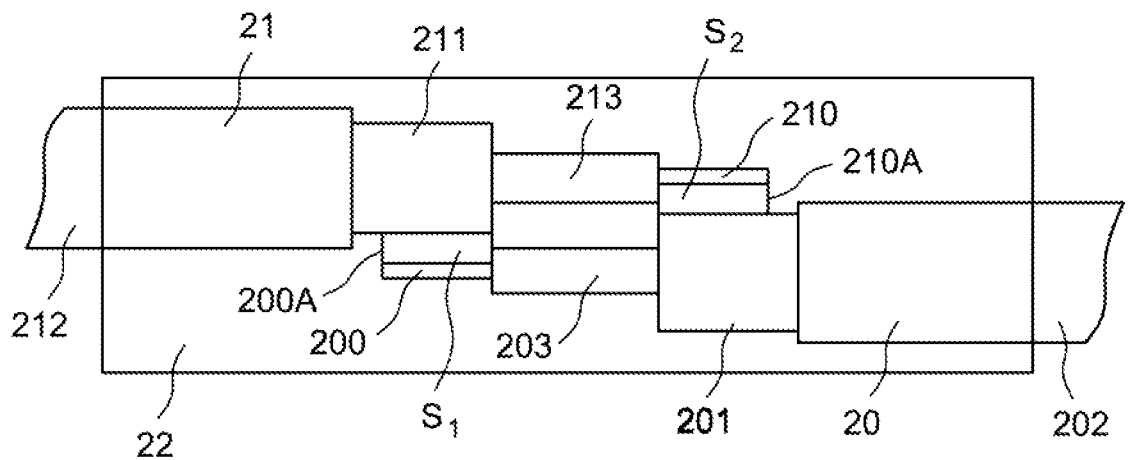
FIG. 8 is a schematic detailed view showing the production of the antenna loop according to FIG. 7.

FIG. 8 shows in detail the advantageous production of the discontinuity between cores 200, 210 and pleats 201, 211. The core 200 of a section 20 is welded by means of a weld S1 to the pleat 211 of the other section 21 and conversely: the core 210 of the section 21 is welded to the pleat 201 of the section 20 by means of a weld S2. As also shown, each section comprises a sleeving 203 respectively 213 isolating the core 200 respectively 210 from the pleat 201 respectively 211. An insulating sleeving 202 respectively 212 is also provided outside of the pleat 201, respectively 211. Finally, a heat-shrinkable sleeve 22 completely isolates the whole discontinuity.

Figure 9:
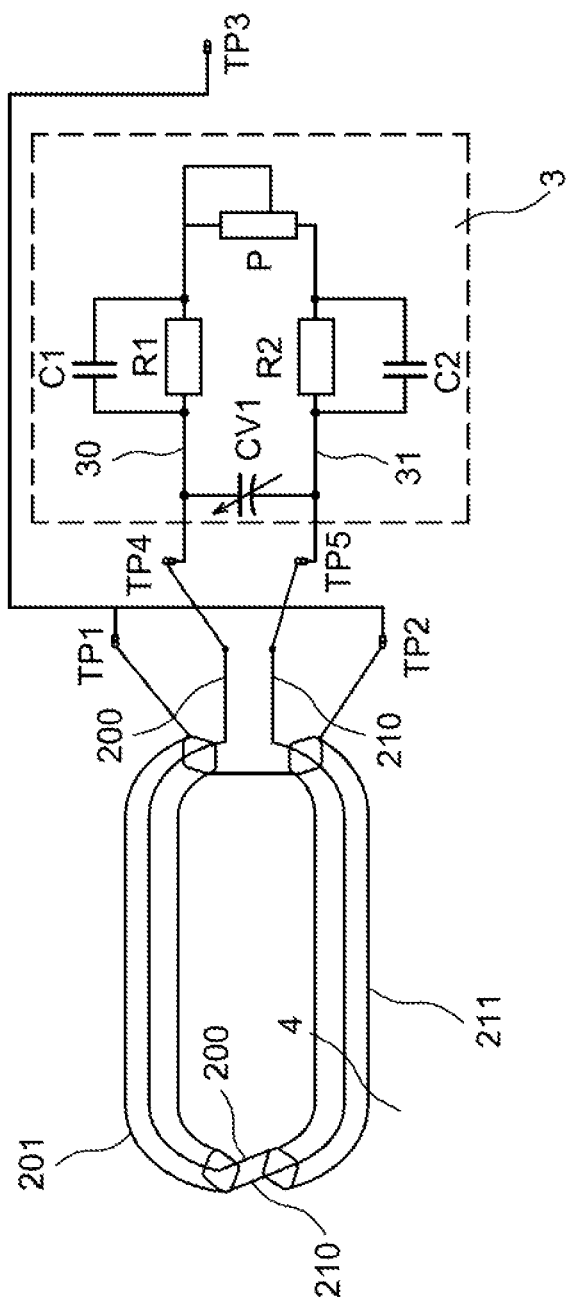
FIG. 9 represents the electronic cabling diagram of an embodiment of an electronic correction cell of an antenna-RFID reader according to the invention.
Figure 10:
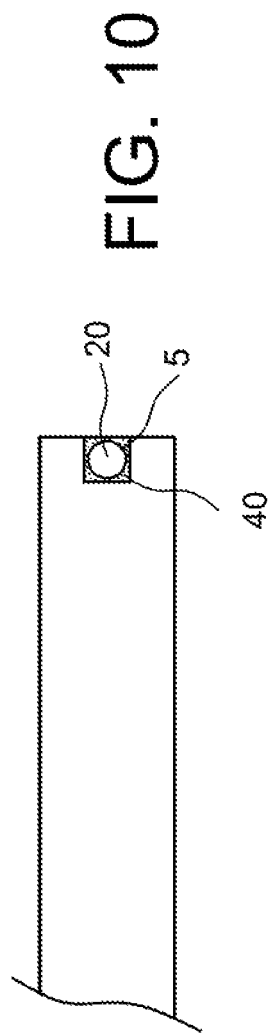
FIG. 10 shows in detail a variant of attachment of an antenna-RFID reader according to the invention to a plate-support.

As represented in FIG. 9, the two ends of cores of the antenna reader separated from each other can be connected to an electronic correction cell 3 to the points TP4 and TP5. Said correction cell 3 comprises at the input a variable capacitance CV1 connecting the two cores 200, 210 for the adjustment of the tuning frequency and a potentiometer P adapting the impedance typically to 50 Ohms, once the antenna 2 is in installed configuration in the strongly metallic environment.

Moreover, as represented, the two lines 30, 31 are connected together by the potentiometer and each comprises an assembly R1, C1 connected in parallel respectively R2, C2.

Typically, the values are the following:
C1=C2=4.7 pF
R1=R2=12 kOhm
CV1 variable from 1.8 to 10 pF
P variable from 0 to 200 k.

For a glove box environment with translucent wall based on lead glass, the inventors have chosen to use a plate-support 4 made of transparent material. More exactly, the sections of coaxial cable 20, 21 are inserted and bonded in a groove 40 using an adhesive 5 on the periphery of the plate-support 4, as illustrated in detail in FIG. 6. Whatever the point at the periphery of the plate-support 4, the radius of curvature of the sections is less than 4 mm in order not to generate too many mechanical deformations therein. The grooving 40 is moreover suitable for taking into account the extra thickness caused by the core/pleat crossing as illustrated in FIG. 4.

Thus, it is possible to define a plate-support of thickness enabling it to be inserted between the lead based wall and the other translucent wall. As a result, any metallic influence of the lead based wall is avoided. The plate-support being moreover made of translucent material, it does not alter the visibility through the glove box.

Figure 11:
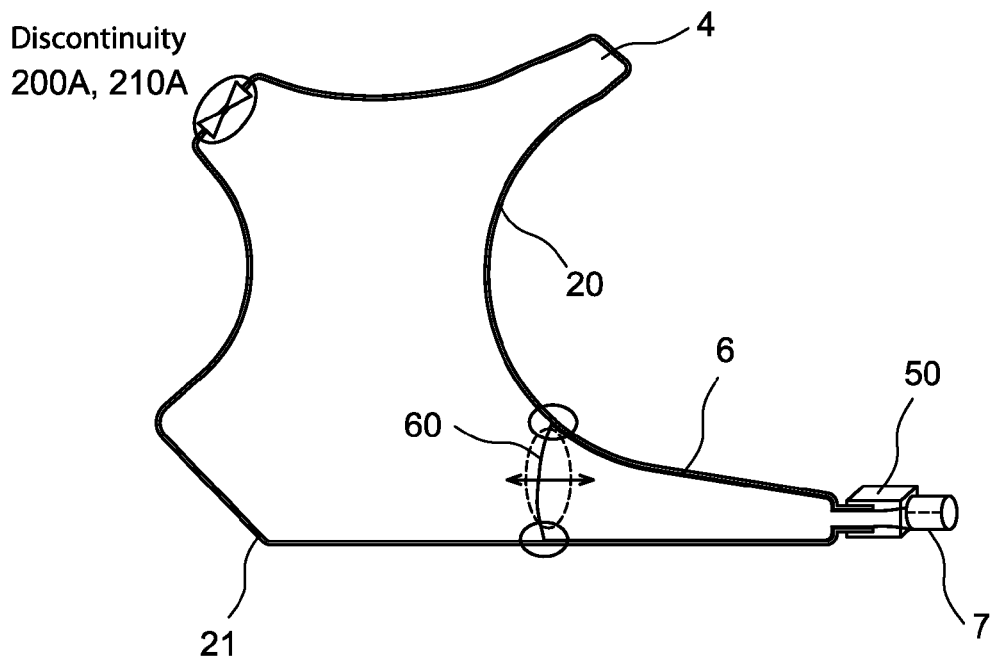
FIG. 11 shows an electrical supply embodiment of an antenna-reader according to the invention by electromagnetic coupling with a primary loop.

To supply the antenna reader 2 with power, the inventors considered using a solution of electromagnetic coupling with a primary loop, which makes it possible to supply the resonator with radiofrequency power without degrading the robustness at the level of the discontinuities of the antenna with alternate sections as presented above. This moreover makes it possible to conserve the possibility of an adaptation of impedance at 50 Ohm. FIG. 11 shows schematically such a primary loop 6 that is added in part along portions of sections 20, 21 of coaxial cable: the loop 6 and the sections of cable 20, 21 are laid out as close as possible to each other, typically less than 0.5 mm. In the embodiment variant of insertion of sections of cable in a groove 40 at the periphery of the plate-support 4, the primary loop 6 is also inserted jointly. Only one portion 60 of the primary loop does not follow the sections of coaxial cable, said portion also being inserted preferably in the plate-support 4. Typically, the loop is formed of an enamelled copper wire of diameter of 0.2 to 0.3 mm, such as those commercialised under the reference "Radiospares RS 357-716". The angles of curvature are here also chosen to not generate too many deformations: they are typically of the order of 3 mm. In this FIG. 11 it may be seen moreover that a box 50 that houses the electronic correction cell 3 is mounted at the discontinuity of the cores 200, 210 near to the plate-support 4, with a connector 7 at the end: the plate-support 4, antenna RFID reader 2, primary supply loop 6, electronic correction cell assembly thereby forms an autonomous module.

Figure 12:
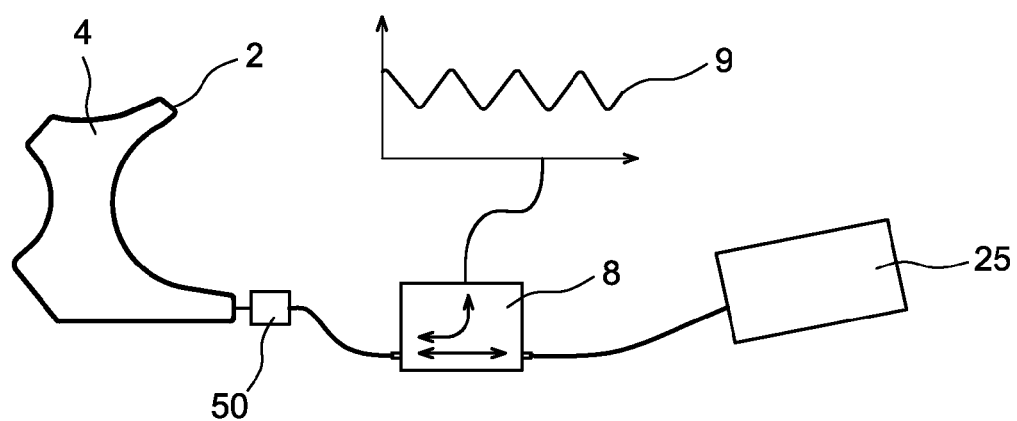
FIG. 12 shows an adjustment diagram using the correction cell according to FIG. 11 and enabling the adjustment of the antenna-RFID reader once in installed configuration in a strongly metallic environment.

In FIG. 12 is represented the schematic diagram of the different means enabling the adjustment of the antenna-RFID reader once in installed configuration in a glove box between a wall based on lead glass and a translucent wall made of Plexiglas. More exactly, this diagram shows the means enabling the tuning of the frequency, typically to 13.56 MHz, and the adaptation of impedance at 50 Ohm, of the antenna RFID reader 2 described with its correction cell 3 and its primary supply loop by electromagnetic coupling 6.

The method consists in using a directive coupler 8 between the electronic reader module 25 of the RFID antenna and an oscilloscope 9. The oscilloscope makes it possible to visualise the signal at 13.56 MHz which represents the electromagnetic wave returning on the coupler 8. The amplitude of this signal is thereby minimised by successive action on the variable capacitance CV1 of the correction cell 5 with a view to obtaining the tuning and on the potentiometer P with a view to obtaining the damping of the antenna RLC circuit. This method is advantageous because it enables an in-situ adjustment taking account of the real strongly metallic environment using a minimum of means (directive coupler 8, oscilloscope 9).

In a glove box G environment, this comprises typically metal bandings C suitable for receiving handling glove ports. The inventors then judiciously thought to define a shape of antenna circuit reader in order that its electromagnetic signal is amplified by said metallic bandings. This shape is already represented in FIGS. 11 and 12.

In fact, a banding subjected to the electromagnetic field of the antenna reader 2 develops an electromagnetic force and a secondary current then flows in said banding. Said short-circuit banding is then the source of a secondary emission of electromagnetic field. Thus, by adapting the shape of the sections of antenna in order that it hugs that of at least one metal banding without surrounding it, the electromagnetic field of the banding is added to that of the antenna reader 2.

Figure 13A:
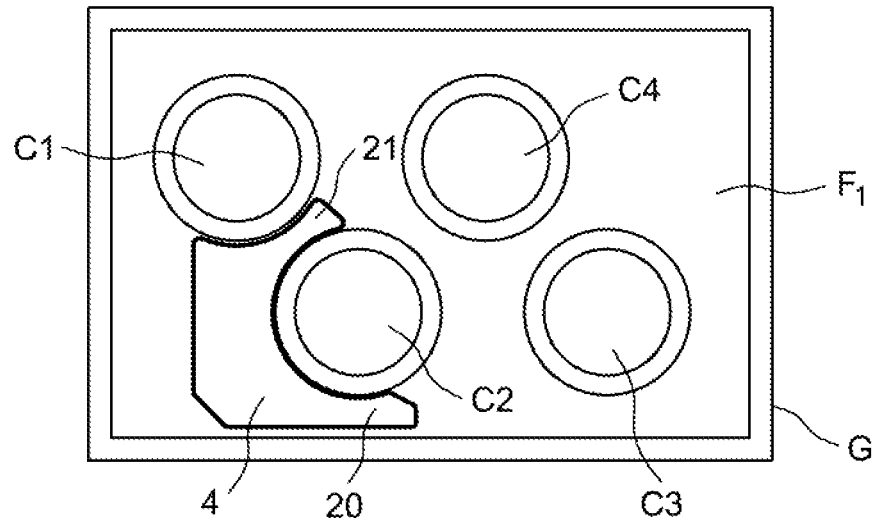
FIGS. 13A and 13B show two modes of installation of a plate-support of the antenna-RFID reader according to the invention in an enclosure delimiting a strongly metallic environment.
Figure 13B:
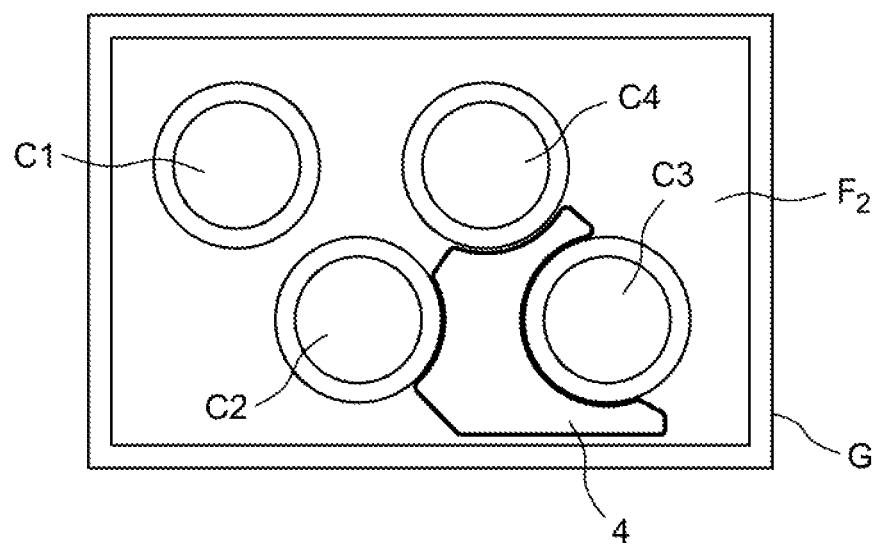

Two advantageous modes of installation on a same glove box G of a module comprising the antenna RFID reader 2 according to the invention and the plate-support at the periphery of which it is attached are represented in FIGS. 13A and 13B:

- in FIG. 13A, it may be seen that, on one of the faces F1 of the glove box, the shape of the plate-support 4 of the sections of antenna 20, 21 hugs that of two metallic bandings C1, C2 of handling glove ports without surrounding any thereof,
- in FIG. 13B, it may be seen that on another face F2 of the glove box, the shape of the plate-support 4 of the sections of antenna 20, 21 hugs those of three metal bandings C1, C2, C3 of handling glove ports without surrounding any thereof.

The solution according to the invention enables a reliable reading of metal casks continuously moving through the glove boxes, and does so without substantial modifications to both casks and glove boxes since the proposed radiofrequency identification device may be installed easily without having to over-dimension existing casks and glove boxes or to redefine them completely.

The invention claimed is:

1. A device for identifying a metal substrate present in a strongly metallic environment that may also be dusty, the identification device comprising:
    a passive radio-frequency identification (RFID) label;
    a label carrier made of electrically insulating material adapted to be attached to the metal substrate and to position the label at a distance therefrom, and comprising
       a housing configured to enclose the label; and
       an RFID reader having an antenna that includes, as an induction loop, a first section and a second section of coaxial cable each having a substantially identical length and each including a metal core and a metal pleat surrounding the core, said first and second sections being linked together at one end of each by connecting the core of said first section to the pleat of said second section, and by connecting the core of said second section to the pleat of said first section, the first and second sections also being linked together at another end of each by connecting only the pleats together,
    wherein the cores of said first and second sections are separated at each said another end.

2. The identification device according to claim 1, wherein the label carrier comprises a part made of electrically insulating material comprising a slide housing in which the RFID label can slide.

3. The identification device according to claim 2, wherein the part made of electrically insulating material is based on polyethylene (HDPE).

4. The identification device according to claim 1, wherein dimensions of the label carrier are adapted to position the label at a distance of at least 4 mm from the metal substrate.

5. The identification device according to claim 1, wherein a diameter of the sections of coaxial cable is less than or equal to 1.05 mm.

6. The identification device according to claim 1, further comprising:
    an electronic correction cell connected to cores separated from the antenna loop, the cell comprising means for adapting an impedance and tuning a frequency of the antenna loop in an installed configuration in the metallic environment.

7. The identification device according to claim 1, further comprising:
    a primary loop to supply the antenna loop by electromagnetic coupling, the primary loop being connected to an electronic module of the reader configured to read identification data coming from the passive label.

8. The identification device according to claim 1, wherein the label is configured for emitting at a frequency of 13.56 MHz and in which the two sections of coaxial cable of the antenna of the reader have an average capacitance of 97 pF/m and a total length of the order of 1.2 m.

9. A metallic container on which is attached a label carrier of the identification device according to claim 1.

10. The metallic container according to claim 9, further comprising:
    a cask suitable for containing nuclear fuel elements.

11. The metallic container according to claim 10, wherein said nuclear fuel elements are powder of plutonium oxides, powder of uranium oxides, or both.

12. The identification device according to claim 1, wherein said connection between the core of the first section and the pleat of the second section is a direct connection, and said connection between the core of said second section to the pleat of said first section is a direct connection.

13. An enclosure comprising:
    a plurality of walls demarcating a confined strongly metallic environment,
    wherein the antenna of the RFID reader of the identification device according to claim 1 is attached to at least one of said walls.

14. The enclosure according to claim 13, wherein said walls are translucent, and
    wherein the sections of antenna are attached to a periphery of a transparent plate-support itself attached to one of the translucent walls of the enclosure.

15. The enclosure according to claim 14,
wherein at least one of the translucent walls comprises a first panel based on lead glass and a second panel based on glass other than lead, and
wherein the plate-support of the sections of antenna is disposed between said first and second panels of the translucent wall.

16. The enclosure according to claim 13,
wherein the sections of antenna are attached to a periphery of a plate-support such that a radius of curvature of said sections is less than 4 mm along an entirety of the periphery.

17. The enclosure according to claim 13,
wherein one of said walls is pierced with holes each surrounded by a metal banding configured to receive a glove for handling a container inside the enclosure, and
wherein a shape of the plate-support of the sections of antenna conforms to a shape of at least one metal banding without surrounding said at least one metal banding.

18. The enclosure according to claim 17,
wherein the shape of the plate-support of the sections of antenna conforms to a shape of at least two metal bandings without surrounding any of said at least two metal bandings.

19. A method comprising:
identifying casks containing nuclear fuel elements in a production unit of nuclear fuel element using a device for identifying a metal substrate present in a strongly metallic environment that may also be dusty,
wherein the identification device comprises
   a passive radio-frequency identification (RFID) label;
   a label carrier made of electrically insulating material adapted to be attached to the metal substrate and to position the label at a distance therefrom, and comprising
   a housing configured to enclose the label; and
   an RFID reader having an antenna that includes, as an induction loop, a first section and a second section of coaxial cable each having a substantially identical length and each including a metal core and a metal pleat surrounding the core, said first and second sections being linked together at one end of each by connecting the core of said first section to the pleat of said second section, and by connecting the core of said second section to the pleat of said first section, the first and second sections also being linked together at another end of each by connecting only the pleats together,
   wherein the cores of said first and second sections are separated at each said another end.

20. A device for identifying a metal substrate present in a strongly metallic environment that may also be dusty, the identification device comprising:
a passive radio-frequency identification (RFID) label; and
a label carrier comprising
   a ferrite element adapted for attachment to the metal substrate and to position the label at a distance therefrom, and comprising a short-circuit loop disposed inside circuit looping of a label antenna; and
   a radio frequency identification (RFID) reader having an antenna that includes, as an induction loop, first section and a second section of coaxial cable each having a substantially identical length and each including a metal core and a metal pleat surrounding the core, said first and second sections being linked together at one end of each by connecting the core of said first section to the pleat of said second section, and by connecting the core of said second section to the pleat of the first section, the first and second sections also being linked together at another end of each by connecting only the pleats together,
   wherein the cores of said first and second sections are separated at each said another end.

21. The identification device according to claim 20,
wherein a diameter of the sections of coaxial cable is less than or equal to 1.05 mm.

22. The identification device according to claim 20, further comprising:
an electronic correction cell connected to the cores separated from the antenna loop, the cell comprising means for adapting an impedance and tuning a frequency of the antenna loop in installed configuration in the environment.

23. The identification device according to claim 20, further comprising:
a primary loop to supply the antenna loop by electromagnetic coupling, the primary loop being connected to an electronic module of the RFID reader suitable for reading identification data received from the passive RFID label.

24. The identification device according to claim 20,
wherein the label is configured for emitting at a frequency of 13.56 MHz, and
wherein the two sections of coaxial cable of the antenna of the reader have an average capacitance of 97 pF/m and a total length of the order of 1.2 m.

25. A metallic container on which is attached a label carrier of the identification device according to claim 20.

26. The metallic container according to claim 25,
comprising constituting a cask suitable for containing nuclear fuel elements.

27. The metallic container according to claim 26, wherein said nuclear fuel elements are powder of plutonium oxides, powder of uranium oxides, or both.

28. An enclosure comprising:
a plurality of walls demarcating a confined strongly metallic,
wherein on at least one said wall is attached the antenna of the RFID reader of the identification device according to claim 20.

29. The enclosure according to claim 28,
wherein the walls are translucent, and
wherein the sections of antenna are attached to a periphery of a transparent plate-support which is itself attached to one of the translucent walls of the enclosure.

30. The enclosure according to claim 29,
wherein at least one of the translucent walls comprises a first panel based on lead glass and a second panel based on glass other than lead, and
wherein the plate-support of the sections of antenna is disposed between the first and second panels of the translucent wall.

31. The enclosure according to claim 28,
wherein the sections of antenna are attached to a periphery of a plate-support such that their radius of curvature is less than 4 mm along an entirety of said periphery.

32. The enclosure according to claim 28,
wherein one of said walls is pierced with holes each surrounded by a metal banding configured to receive a glove for handling a container inside the enclosure, and
wherein a shape of the plate-support of the sections of antenna conforms to a shape of at least one metal banding without surrounding said at least one metal banding.

33. The enclosure according to claim 28,
wherein a shape of the plate-support of the sections of antenna conforms to a shape of at least two metal bandings without surrounding any of said at least two metal bandings.

34. A method comprising:
identifying casks containing nuclear fuel elements in a production unit of nuclear fuel element using a device for identifying a metal substrate present in a strongly metallic environment that may also be dusty,
wherein the identification device comprises
a passive radio-frequency identification (RFID) label; and
a label carrier comprising
- a ferrite element adapted for attachment to the metal substrate and to position the label at a distance therefrom, and comprising a short-circuit loop disposed inside circuit looping of a label antenna; and
- a radio frequency identification (RFID) reader having an antenna that includes, as an induction loop, a first section and a second section of coaxial cable each having a substantially identical length and each including a metal core and a metal pleat surrounding the core, said first and second sections being linked together at one end of each by connecting the core of said first section to the pleat of said second section, and by connecting the core of said second section to the pleat of said first section, the first and second sections also being linked together at another end of each by connecting only the pleats together,
wherein the cores of said sections are separated at said another end.

* * * * *